No Printed Specification Available
9605X
G. Holloway,
Brick Machine.
Patented Apr. 21, 1836.
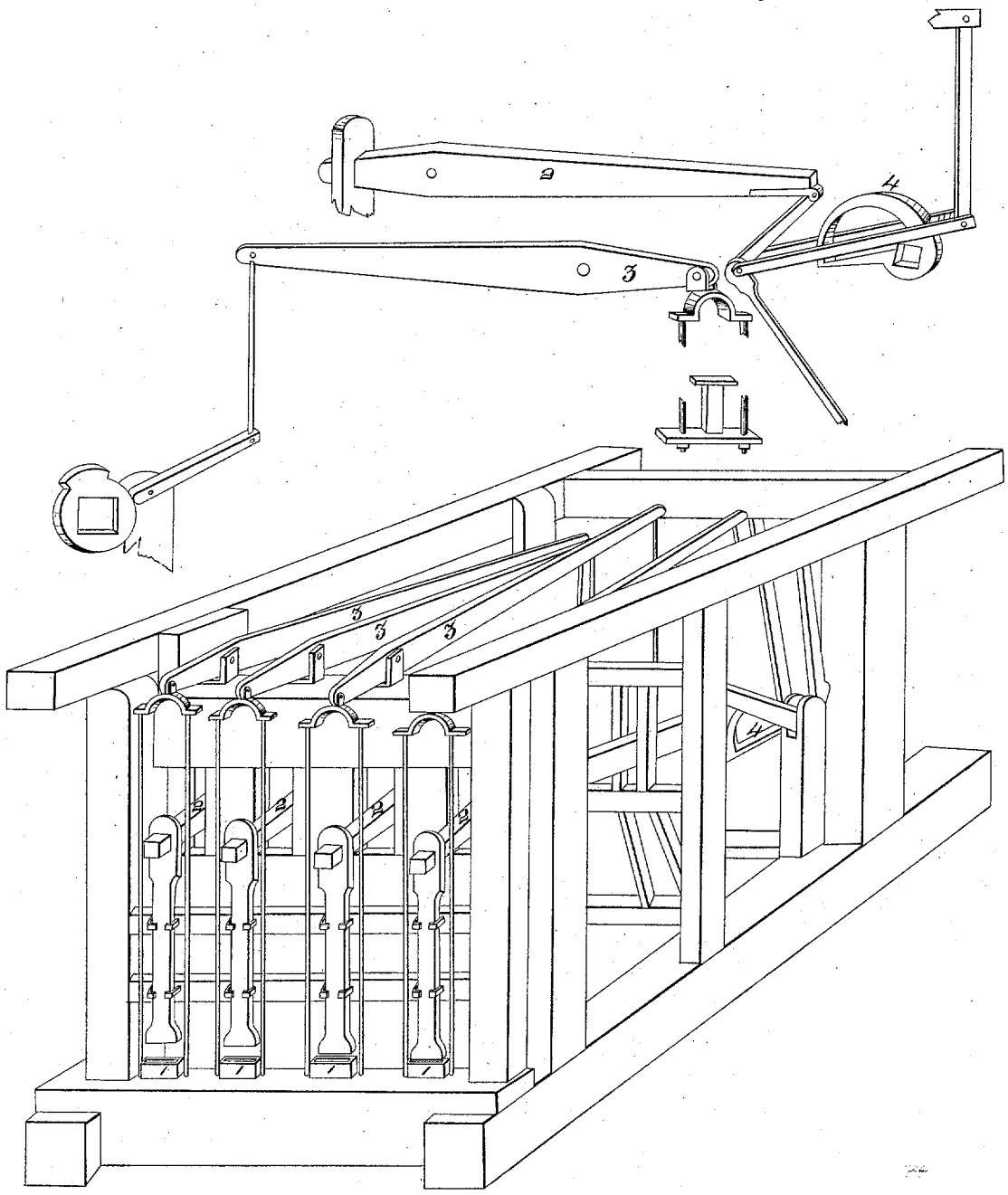
AM. PHOTO-LITHO. CO. N.Y. (OSBORNE'S PROCESS)

4/21/1836 9605X

Apl 21.1836 377.

Gooding Holloway of Miamisburg Ohio
Letters Patent
The Schedule referred to in these Letters Patent and making part of the
same containing a description in the words of the said Gooding Hol
loway himself of his improvement in the machine for making and
pressing Bricks from moist or untempered clay To all to whom these presents shall come. Be it Known that
I Gooding Holloway of the Town of Miamisburg in the County of
Montgomery and State of Ohio have invented a new and useful ma
chine, including the frame and ground work supporting the same
for making and pressing Bricks. from moist or untempered clay.
and that the following is a full and exact description thereof as placed
upon the foundation and frame for working four moulds abreast (but
may vary in dimensions according to the number of moulds to be used)
The ground or main sills to be 18 by 24 in sqr. The longest or
side ones 22 ft. and the end or short ones 12 ft. in length, with
a suitable number of ties, or girders to hold them firmly in place
[illegible] String pieces 7 ft. 9 in long to be framed into the middle or
center tie and the rear or back sill 8 inches sqr for the purpose of
receiving the foot of the joint levers. The main side sill next where the
power is applied may be 32 feet long in order to erect a frame to
receive the main or driving wheel 10 ft. if it reducible to 8 in sq.
On each end of the front sill stands a post 6 by 8 in sq. extending
into the plate above into which are framed two cross pieces two feet
apart and the lower one 18 in above the sills for holding the clamps
to confine the piston or condensing bars in their places of perpendicular
action as hung upon the ends of the long levers. Immediately behind or
[illegible] in. from the front sill are placed two main posts 18 in sq. & 10 1/2
feet high from the top of the sill to the under side of the plate (which plate
should be 8 in sqr. and corresponding length of the sills) mortice through
the main sills and let in with dove tail tenon well pinned. and also
secured by strong iron stirrups passing under the sills and bolted through the post 12 in above the tenon. Into these posts are framed two
main beams. The upper one 18 by 24 in sqr and the lower one 18 by
12 in with double tenons. They are to be placed 21 in apart and the
lower one 5 ft. above the main sill, let in with a rebate of 3
in to the posts and between them are to be placed 8 pieces or uprights
7 in wide and 3 in thick framed in by mortises for the purposes of hang
ing and confining the main or long levers. On the top of the upper beam
are placed 4 short posts on which hang the discharging levers 3 feet
3 in in rear of the forward main posts are placed two more posts 8 in
square, of same height as the others, which receive or contain two more
beams with uprights same in number as the forward ones but of less
size, 2 by 4 in sqr and 2 ft 7 in long. to serve as guides for the back
ends of the main levers. 5 ft. 3 in behind the last named or middle
posts on the right hand side, is to stand another 12 in sq. of equal
height to receive the end of the shaft on which the Rams are fixed,
and on the opposite side next the main wheel are placed two other posts -
in the sill 3 1/2 ft. apart of like dimensions, into which are let
or slipped two cross pieces 5 ft long and of suitable size to receive the
ends of the Ram wheel and Spur wheel shafts. The former to be 4 1/2
ft. from the top of the sill to the centre of the shaft. Immediate
ly in front of the rear main post that contains the Ram wheel shaft
is placed a piece of timber 8 in sqr, into this are set 4 posts 6 ft
high, in the top of which hang the short Ram levers that operate upon the discharging levers by means of
connecting Rods. Into the upper end of the Ram wheel main post
and the opposite plate is inserted a beam or cross piece, to which are
attached the perpendicular suspending bars of the double Ram rods con
nected with the joint levers. That part of the frame containing the main
driving wheel is connected with the first already described and should
be of corresponding dimensions. The main cog wheel to be 14 ft. in dia
meter placed near the top of its vertical shaft of 24 inches diameter, to be
moved or propelled by animal or steam power. The former by inclined
plain or at the end of a horizontal bar 14 ft. from the shaft and 2 ft
from its base. Into the main cog wheel plays a spur wheel 21 inches di 4/21/1836 9605x

[illegible] placed on the end of a shaft 8 ft. long. at the other end is another
spur wheel of same size playing into a wheel 8 ft diameter which turns
a shaft wherein is placed the Kams that move the joint and main long lev-
ers. as well as the Kams for working the discharging levers. The
aforesd Kams may be made of wood strapped with iron; or wholly of
cast iron 2 1/2 feet in length from the centre of the shaft on which
they are placed to the point or end of the same in shape of letter D.
The small Kams to operate the discharging levers should be 4 1/2 inch-
es in length and 1/4 the distance round the shaft for the purpose of
raising and holding up the Brick sufficient time for removal.
The first mentioned Kams, which move the joint and long levers,
act between two iron rods attached to the joint of the joint levers by
means of a bolt passing through the whole of them. To the other end
of these Rods is placed a friction Roller against which the Kams
strike in moving round. The rods are attached to the end of the [illegible]-
ding bars, and hung at the upper end by a bolt or hook. The lower
part of the joint lever is 5 ft. long and the upper part 2 ft 9 inch-
es each measuring from the centre of the joint. The upper end is
connected by means of a joint to the end of the long lever working under
it. The lower end of the joint lever is hung by and plays on a
bolt passing through it and the [illegible] piece in which the foot rests
The main lever is 12 ft long and 4 1/2 in thick and 16 in at the
widest part where it is hung by a 2 in iron bolt playing in an iron
box within 2 1/2 ft. of the forward end and tapering to 4 1/2 in at the
other. The condensing or pressing power is applied by means of a piston
bar or piece of timber of suitable size to enter the moulds at the lower
end. which is to be faced with iron or steel polished entirely smooth
The upper part of the bar to be sufficiently wide to hang upon the
end of the of the main levers by mortise made rounding on the un-
der side and is confined to its perpendicular action by the clamps
before mentioned. The Bricks when pressed are raised out of the
mould by means of the discharging levers (working above the main
levers) which are moved by the small Kams acting upon the steel lever, connected by a rod with the said discharging lever 11/2 feet in
length and hung 2 1/2 ft. from the fore end where it is 6 in wide and
2 in thick tapering to a square, same as the long levers. On the
front end is hung a stirrup or bail at each end of which small
rods, 15 in apart are attached reaching down through the main
front sill on each side of the mould and through each end of a
cross bar of iron or timber, on the centre of which stands, a short
post or stem for the purpose of lifting up the Brick to the top of the
mould, fastened by nuts or screws on the end of the rods. The short
lever connected by a rod with the delivering lever is 4 ft. 3 in long &
3 by 2 in sqr and is hung 12 in from the end of the same.
The lower part of the same levers are connected by rods 6 ft. 8 in.
long. The moulds which are to be set into the main front sill
may be cast whole, or in 4 pieces and put together by screws. the
latter form is preferable; on account of polishing the inside more per
fectly smooth which is essentially necessary. The top may be half
an inch concave for the purpose of pressing the bricks more solid
at the ends. The lower or bottom part to be a plate of iron or steel
fitted and fastened upon a block of wood to fill the mould as close
as possibly consistent with its movement. to the centre of which
also is attached the stem passing down through the sill and fasten
ed to the bottom of the aforesd. moving stirrup for raising the brick
out of the moulds as previously described. A screen for the pur
pose of pulverising sifting and cleaning the clay is made of wire No 4.
2 1/2 feet diameter and 6 ft. long fastened upon a reel with bands
of sheet iron on each end of 4 inches wide, and a second one 12
in forward of the first, one foot in width for the purpose of protecting
that part of the screen where the clay is thrown in. The whole to be turn
ed by a band or rope passing round a wheel upon the upper wheel shaft &
also round a wheel fastened upon the shaft of the reel placed so near
the moulds that one end or gudgeon may be let into one of the main
front posts and the other into a smaller one or crotch for the pur
pose of supporting the same. What I claim as my own in vention and not previously known in the above described machine and
its groundwork is in the first place the general construction of the
frame supporting and containing the whole machinery. Secondly
I claim the new application of the joint lever, to the end of the long or
main lever, whereby superior power is obtained. Also the bars
or double cam rods, through which the cam passes. Likewise the
friction Rollers as fixed in the end of the same against which
the cam strikes when moving round. Also the suspending bars
and the way and manner they are attached to the frame rods.
Also the application of the long and short discharging levers with the
manner of hanging and connecting the same. The stirrup also is hung
by a swivel upon the end of the discharging lever for the purpose
of raising the brick out of the moulds as also the small frame
before described. I further claim the improved construction posi-
tion and propelling of the [illegible], and in conclusion the combined appli-
cation and operation of the three different powers or principles embra-
ced in and by the cams joint lever and main long lever or any two of
them to be used or worked by steam animal or hand power in any
machine for one or more moulds, for the aforesaid purposes of making
and pressing Bricks from moist or untempered clay.

Exd. MG.

Witnesses
Thomas Johns
Chs. M. Keller

Sheding Holloway (2114 words)

(Patented April 21. 1836)

Drawing